(12) United States Patent
Rieder et al.

(10) Patent No.: US 12,104,940 B2
(45) Date of Patent: Oct. 1, 2024

(54) VIBRONIC MEASUREMENT SENSOR HAVING AT LEAST TWO TEMPERATURE SENSORS

(71) Applicant: Endress+Hauser Flowtec AG, Reinach (CH)

(72) Inventors: Alfred Rieder, Landshut (DE); Vivek Kumar, Allschwil (CH); Josef Hubensteiner, Freising (DE); Mattia Alioli, Binningen (CH)

(73) Assignee: Endress+Hauser Flowtec AG, Reinach (CH)

( * ) Notice: Subject to any disclaimer, the term of this patent is extended or adjusted under 35 U.S.C. 154(b) by 144 days.

(21) Appl. No.: 17/414,378

(22) PCT Filed: Dec. 17, 2019

(86) PCT No.: PCT/EP2019/085514
§ 371 (c)(1),
(2) Date: Jun. 16, 2021

(87) PCT Pub. No.: WO2020/127173
PCT Pub. Date: Jun. 25, 2020

(65) Prior Publication Data
US 2022/0065676 A1 Mar. 3, 2022

(30) Foreign Application Priority Data
Dec. 18, 2018 (DE) ............ 10 2018 132 672.6

(51) Int. Cl.
*G01F 1/84* (2006.01)
*G01F 15/02* (2006.01)
*G01N 9/00* (2006.01)

(52) U.S. Cl.
CPC .......... *G01F 1/8477* (2013.01); *G01F 1/8422* (2013.01); *G01F 1/8427* (2013.01);
(Continued)

(58) Field of Classification Search
CPC .... G01F 1/8477; G01F 1/8422; G01F 1/8427; G01F 1/8431; G01F 15/0222
(Continued)

(56) References Cited

U.S. PATENT DOCUMENTS

| | | | |
|---|---|---|---|
| 4,768,384 | A | 9/1988 | Flecken et al. |
| 2004/0187599 | A1 | 9/2004 | Drahm et al. |
| 2011/0113896 | A1* | 5/2011 | Drahm ............... G01F 15/00 73/861.357 |

(Continued)

FOREIGN PATENT DOCUMENTS

| | | |
|---|---|---|
| CN | 1934425 A | 3/2007 |
| CN | 101019008 A | 8/2007 |

(Continued)

OTHER PUBLICATIONS

Kumar, Vivek and Anklin, Martin, Numerical Simulations of Coriolis Flow Meters for Low Reynolds Number Flows, Mapan—Journal of Metrology Society of India, vol. 26, No. 3, 2011, pp. 225-235.

*Primary Examiner* — Alexander A Mercado
*Assistant Examiner* — Rodney T Frank
(74) *Attorney, Agent, or Firm* — Christopher R. Powers; Endress+Hauser (USA) Holding, Inc.

(57) ABSTRACT

A vibronic measurement sensor includes two measuring tubes for conveying the medium and two temperature sensors, each arranged on a surface portion of the measuring tubes, respectively, wherein: centroids of the two surface portions relative to an intersection line between a longitudinal plane of symmetry and the transverse plane of symmetry of the sensor are rotationally symmetrical to one another; the first centroid lies in a first section plane running perpendicular to a measuring tube center line of the first measuring tube, wherein an intersection point of the measuring tube center line with the first intersection plane is defined; and the first centroid is arranged relative to the intersection point of the measuring tube center line such that (Continued)

a measurement accuracy of the sensor is largely independent of the installation position, even when inhomogeneous temperature distributions are formed over measuring tube cross-sections at low Reynolds numbers.

16 Claims, 5 Drawing Sheets

(52) U.S. Cl.
CPC .......... *G01F 1/8431* (2013.01); *G01F 15/022* (2013.01); *G01N 9/002* (2013.01); *G01N 2009/006* (2013.01)

(58) Field of Classification Search
USPC ........................................................ 73/32 A
See application file for complete search history.

(56) References Cited

U.S. PATENT DOCUMENTS

| | | |
|---|---|---|
| 2012/0222479 A1 | 9/2012 | Zhu et al. |
| 2013/0031973 A1 | 2/2013 | Kirst et al. |
| 2013/0139613 A1 | 6/2013 | Van Cleve |

FOREIGN PATENT DOCUMENTS

| | | |
|---|---|---|
| CN | 101903754 A | 12/2010 |
| CN | 102483341 A | 5/2012 |
| CN | 102652253 A | 8/2012 |
| CN | 102667420 A | 9/2012 |
| CN | 103370605 A | 10/2013 |
| CN | 104105955 A | 10/2014 |
| CN | 106104223 A | 11/2016 |
| CN | 108072411 A | 5/2018 |
| DE | 102009046839 A1 | 5/2011 |
| DE | 102012201592 B3 | 3/2013 |
| DE | 102015221350 A1 | 10/2014 |
| DE | 102015109790 A1 | 12/2016 |
| DE | 102016112600 A1 | 1/2018 |
| DE | 102017106209 A1 | 7/2018 |
| EP | 0275367 A2 | 7/1988 |
| EP | 0803713 A1 | 10/1997 |
| JP | 2008064544 A | 3/2008 |
| WO | 2006122881 A2 | 11/2006 |
| WO | 2008064459 A1 | 6/2008 |
| WO | 2012018323 A1 | 2/2012 |
| WO | 2018007176 A1 | 1/2018 |
| WO | 2018121930 A1 | 7/2018 |

\* cited by examiner

VIBRONIC MEASUREMENT SENSOR HAVING AT LEAST TWO TEMPERATURE SENSORS

CROSS-REFERENCE TO RELATED APPLICATIONS

The present application is related to and claims the priority benefit of German Patent Application No. 10 2018 132 672.6, filed on Dec. 18, 2018, and International Patent Application No. PCT/EP2019/085514, filed on Dec. 17, 2019, the entire contents of which are incorporated herein by reference.

TECHNICAL FIELD

The present invention relates to a vibronic measurement sensor comprising at least two temperature sensors for determining at least one physical parameter of a flowable medium, wherein the physical parameter can especially include the temperature, the density, the mass flow rate, and the viscosity of the medium.

In most conventional instances, the measurement sensors in question are designed as Coriolis mass flow meters which, in addition to the mass flow rate, can also detect the temperature, the density, or the viscosity of a medium. Insofar as, on the one hand, the density, the mass flow, and the viscosity of a medium are temperature-dependent and, on the other hand, the elastic properties of a vibronic measurement sensor are temperature-dependent, a measurement of the media temperature is customary given conventional measurement sensors.

BACKGROUND

The disclosure document DE 10 2017 106 209 A1 discloses, for example, a measurement sensor with a first temperature sensor at a first measuring tube and a second temperature sensor at a second measuring tube, wherein the two temperature sensors are offset relative to one another in the longitudinal direction of the measuring tubes. The temperature sensors are especially arranged on the outer sides of the measuring tubes running parallel to each other, said outer sides facing away from one another.

Tests in connection with the present invention have yielded that, given low Reynolds numbers, for example Re<300 and a temperature gradient between the medium and the surroundings of the measurement sensor, a temperature distribution that is inhomogeneous over the measuring tube cross-sections is formed in the measuring tubes, depending on the installation position of the measurement sensor. There is thus the risk that measured temperature values will be influenced depending on the installation position of the measurement sensor and the position of the temperature sensors, with corresponding effects on the correction of temperature influences in the determination of the physical parameters.

SUMMARY

The object of the present invention is therefore to provide a vibronic measurement sensor which has improved measuring accuracy given inhomogeneous temperature distributions. The object is achieved according to the invention by the vibronic measurement sensor according to the present disclosure.

The vibronic measurement sensor 100 according to the invention for determining the at least one physical parameter of a flowable medium comprises, as shown in FIGS. 1 and 8: at least one oscillator having a first measuring tube 110a that is curved in the rest position and used for conducting the medium, and a second measuring tube 110b that is curved in the rest position and used for conducting the medium, and at least one first coupler 132 and a second coupler 132, wherein the measuring tubes 110a, 110b are connected to one another by means of the first coupler 132 and the second coupler 132, wherein a respective portion of the measuring tubes that is capable of oscillation extends between the couplers;

at least one exciter 140 for exciting at least one useful flexural vibration mode of the oscillator, in which the oscillatable portions of the measuring tubes 110a, 110b oscillate counter to one another;

at least one vibration sensor 142 for detecting vibrations of the oscillator, at least in the useful flexural vibration mode, and for outputting vibration-dependent signals;

a first temperature sensor 200a that is arranged at the first measuring tube 110a to output a first temperature measurement signal that depends on a temperature at a first surface portion 210a of the first measuring tube 110a, said first surface portion 210a being contacted by the first temperature sensor 200a;

a second temperature sensor 200b that is arranged at the second measuring tube 110b to output a second temperature measurement signal that depends on a temperature at a second surface portion 210b of the second measuring tube 110b, said second portion 210b being contacted by the second temperature sensor 200b; and an operation and evaluation circuit 250 for driving the exciter 140, for receiving the vibration-dependent signals of the vibration sensor 142 as well as the first and second temperature measurement signals, as well as for determining an oscillation frequency of at least one useful flexural vibration mode of the oscillator based on the vibration-dependent signals of the vibration sensor 142, and for determining the at least one physical parameter of the medium depending on a vibration characteristic of the oscillator that is characteristic of the parameter and on the first and second temperature measurement signals;

wherein the measurement sensor 100 has a longitudinal plane of symmetry ($S_{yz}$) running between the two measuring tubes 110a, 110b, in relation to which the two measuring tubes 110a, 110b run symmetrically with respect to one another, at least between the first coupler 132 and the second coupler 132, wherein the measurement sensor 100 has a transverse plane of symmetry ($S_{xy}$) running perpendicular to the longitudinal plane of symmetry ($S_{yz}$), in relation to which the two measuring tubes 110a, 110b, respectively, have a mirror-symmetrical course at least between the first coupler 132 and the second coupler 132;

wherein a first centroid 220a of the first surface portion 210a and a second centroid 220b of the second surface portion 210b are rotationally symmetrical with respect to one another, with regard to an intersection line (y) between the longitudinal plane of symmetry ($S_{yz}$) and the transverse plane of symmetry ($S_{xy}$);

wherein the temperature sensors 200a, 200b are arranged at a distance from the transverse plane of symmetry ($S_{xy}$);

wherein the first centroid 220a lies in a first section plane running perpendicular to a measuring tube center line 112a of the first measuring tube 110a; wherein in the first section plane an angular coordinate 0 is defined in relation to the intersection point of the measuring tube center line 112a with the first section plane; wherein a vector pointing in the direction θ=0°, starting from the intersection point of the measuring tube center line 112a with the first section plane, points in the direction of the longitudinal plane of symmetry ($S_{yz}$) and runs perpendicular thereto; wherein a vector pointing in direction θ=90°, starting from the intersection point of the measuring tube center line 112a, is directed away from the transverse plane of symmetry ($S_{xy}$);

wherein, according to the invention, the first centroid 220a is arranged in the range of θ=310°+/−30° in relation to the intersection point of the measuring tube center line 112a.

In an embodiment of the invention, the first centroid in relation to the intersection point of the measuring tube center line is arranged in the direction of an angle in the range of θ=310° +/−20°, especially θ=310°+/−10°.

The temperature sensors can be arranged at the oscillatable portions, or also outside of the oscillatable portions.

In an embodiment of the invention, the measuring tube center line of the first measuring tube between the first coupler and the second coupler has a length l, wherein the first section plane has a distance a from the first coupler for which a/l≤0.25, for example a/l≤0.15, especially a/l≤0.08.

In an embodiment of the invention, the measuring tube center line of the first measuring tube between the first coupler and the second coupler has a length l, wherein the first section plane has a distance a from the first coupler for which a/l ≥0.01, for example a/l ≥0.02, especially ≥0.04.

In an embodiment of the invention, the length of the arcuate portion is not less than 30%, especially not less than 35% and preferably not less than 40%, of the length l.

In an embodiment of the invention, the oscillatable portions of the two measuring tubes each have two straight portions and an arcuate portion lying between them, wherein the first section plane intersects the measuring tube center line in a straight portion.

In an embodiment of the invention, the measuring tubes respectively have an internal diameter of not less than 10 mm, especially not less than 12 mm, and preferably not less than 15 mm.

In an embodiment of the invention, the vibronic measurement sensor further comprises a carrier body, and at least a third temperature sensor for detecting a temperature of the carrier body and for outputting a third temperature measurement signal representing the temperature of the carrier body; wherein the measuring tubes are rigidly connected to the carrier body at the inlet end and outlet end; wherein the operation and evaluation circuit is configured to receive the third temperature measurement signal and to take it into account when determining the at least one physical parameter of the medium.

In an embodiment of the invention, the at least one physical parameter includes a density ρ of the medium, wherein the vibration characteristic of the oscillator that is characteristic of the parameter is an oscillation frequency $f_i$ of the oscillator at the resonance of a flexural vibration mode.

The density ρ of the medium can especially be calculated according to:

$$\rho = C_{0i} + C_{1i} f_i^{-2} + C_{2i} T_m f_i^{-2} + C_{3i} T_3 f_i^{-2},$$

wherein the $C_{ji}$ are mode-specific coefficients, $T_m$ denotes an average medium temperature based on the first and second temperature measurement signals, and $T_3$ denotes a temperature of the carrier body based on at least the third temperature measurement signal.

In an embodiment of the invention, the at least one physical parameter includes a mass flow rate of the medium, wherein the vibration characteristic of the oscillator that is characteristic of the parameter includes a phase difference or time difference Δt between the signals of an inlet-end vibration sensor and an outlet-end vibration sensor.

The mass flow rate m of the medium can especially be calculated according to:

$$\dot{m} = Cal \frac{1}{1 + k_m T_m + k_3 T_3} \Delta t - Zer$$

wherein Cal and Zer are calibration factors, $k_m$ and $k_3$ are temperature-correction coefficients, $T_m$ denotes an average medium temperature based on the first and second temperature measurement signals, and $T_3$ denotes a temperature of the carrier body based on at least the third temperature measurement signal.

In an embodiment of the invention, the at least one physical parameter includes a viscosity n of the medium, wherein the vibration characteristic that is characteristic of the parameter includes an attenuation D and an oscillation frequency $f_i$ of oscillation given the resonance of a flexural vibration mode. The attenuation D can be determined in various ways, for example:

based on a relationship between an excitation signal for exciting a flexural vibration mode on the one hand and the amplitude of the flexural vibration mode on the other hand;

an amplitude ratio of oscillations at a resonant frequency of a useful flexural vibration mode and an oscillation outside of the resonance;

or the relationship between the phase shift q between the oscillation amplitude at the excitation signal and the oscillation frequency f, especially one of the derivatives dφ/df or df/dφ given a resonance frequency $f_{res}$.

The viscosity n of the medium can especially be calculated according to:

$$\eta = A_1 \frac{1}{\rho f_i^3} \left( D \frac{1}{1 + d_m T_m + d_3 T_3} - A_0 \right)^2$$

wherein the $A_i$ are calibration factors, $d_m$ and $d_3$ are temperature-correction coefficients, $T_m$ denotes an average medium temperature based on the first and second temperature measurement signals, and $T_3$ denotes a temperature of the carrier body based on at least the third temperature measurement signal.

With the temperature sensors arranged according to the invention, the measurement accuracy achieved in the determination of the cited physical parameters is largely independent of the installation position, even if inhomogeneous temperature distributions are formed over the measuring tube cross-sections at low Reynolds numbers and given the presence of a temperature gradient between medium and surroundings. Inasmuch, the invention also includes the use of the vibronic measurement sensor according to the invention for determining the physical parameter given low Reynolds numbers Re, such as a Reynolds number Re<500, for example Re<200, especially Re<100.

BRIEF DESCRIPTION OF THE DRAWINGS

The invention is now explained in more detail with reference to the exemplary embodiments shown in the figures. The following are shown.

DETAILED DESCRIPTION

Figure 1:
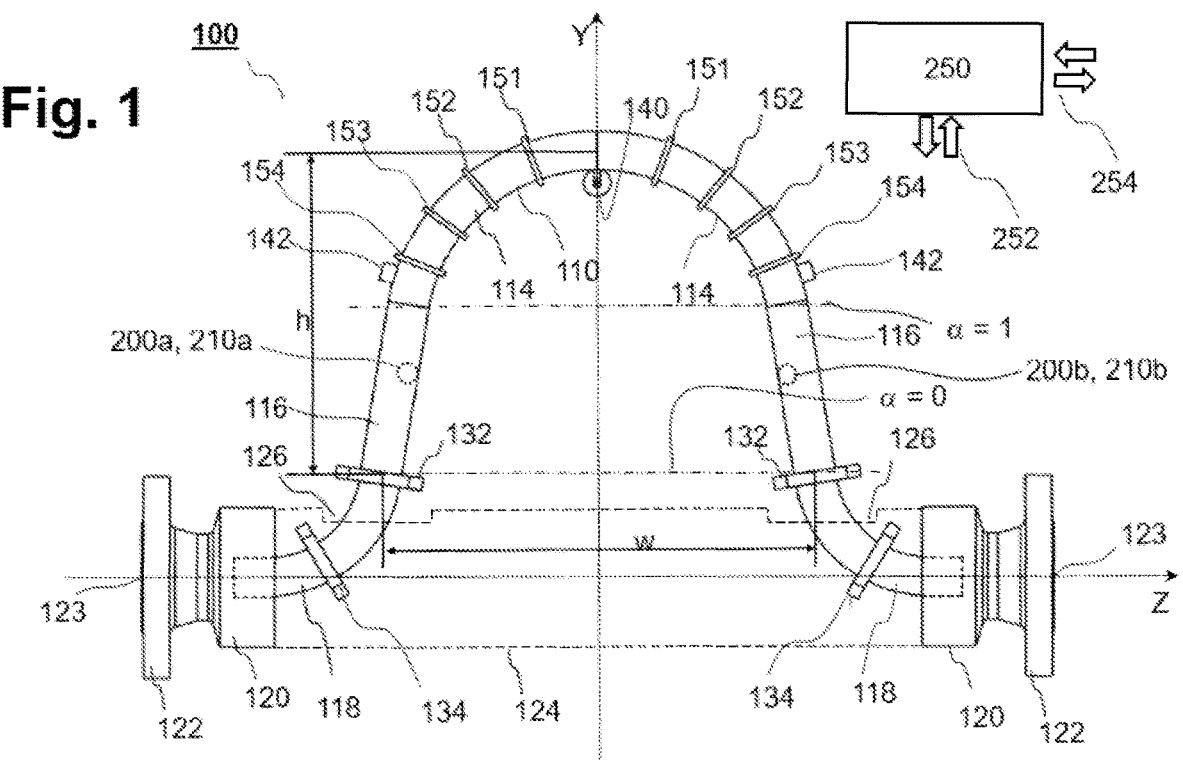
FIG. 1 shows a side view of a measurement sensor according to the present disclosure.

The exemplary embodiment shown in FIG. 1 of a vibronic measurement sensor according to the invention, here in the form of a Coriolis mass flow measurement sensor or density measurement sensor 100, comprises a pair of curved measuring tubes 110. The measuring tubes 110 extend between an inlet-end collector 120 and an outlet-end collector 120 and are firmly connected to them, for example by being rolled in, brazed, or welded. Extending between the collectors 120 is a solid support tube 124 firmly connected to the two collectors, thereby rigidly coupling the collectors 120 to each other. On its upper side, the support tube 124 has openings 126 through which the measuring tubes 110 are guided from the collectors 120, out of the support tube 124 and back again.

The collectors 120 respectively have at the ends a flange 122 by means of which the Coriolis mass flow measurement sensor or density measurement device is to be installed in a pipe. A mass flow of a medium is to be conducted through the pipes 110 via central openings 123 in the flanges 122 to measure the mass flow or its density.

Figure 2:
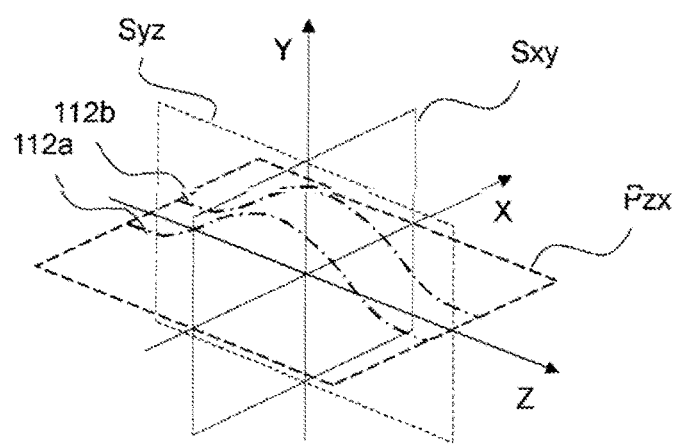
FIG. 2 shows a coordinate system for describing the measurement sensor according to the present disclosure.

Before the detailed structure and the mode of operation of the measurement sensor 100 according to the invention are further explained, a few symmetry properties should be briefly presented with reference to FIG. 2. Measuring tube center axes 112a, 112b of the two measuring tubes 110 which form the oscillator are shown in FIG. 2. The measuring tube center axes 112a, 112b run symmetrically in relation to a first longitudinal plane of symmetry Syz which runs between the measuring tubes. The measuring tube center axes furthermore run symmetrically in relation to a transverse plane of symmetry Sxy which runs perpendicular to the longitudinal plane of symmetry Syz. Summits of the curves of the measuring tubes or of the measuring tube center axes lie in the transverse plane of symmetry.

The measuring tube axes 112a, 112b preferably run in planes which run parallel to the first mirror plane.

There is no symmetry of the measuring tubes with regard to a third plane Pzx which runs perpendicular to the longitudinal plane of symmetry and to the transverse plane of symmetry and in which the measuring tube axes 112a, 112b run within the collectors.

The intersection line between the longitudinal plane of symmetry Syz and the transverse plane of symmetry defines a Y-axis of a coordinate system of the measuring sensor. The intersection line between the transverse plane of symmetry Sxy and the third plane Szx defines an X-axis of the coordinate system, and the intersection line between the longitudinal plane of symmetry Syz and the second plane Pzx defines the Z-axis of the coordinate system. With the coordinates defined in this way, we turn again to FIG. 1.

The measuring tubes 110 form in pairs an oscillator which is to be excited especially in a useful flexural vibration mode in which the measuring tubes oscillate in opposite phase with one another in the X direction.

In order to influence the vibration properties, the measurement tubes 110 are each connected to couplers 132, 134 at the inlet end and outlet end, wherein a free vibration length of an oscillator formed by the two measurement tubes 110 is determined by the position of the two inner couplers 132, that is, those which are each furthest away from the corresponding collector 120 at the inlet end or outlet end. This free vibration length has a great influence on the useful flexural vibration mode of the oscillator, especially on its natural frequency, with which the oscillator is preferably to be excited.

Outer couplers 134, which are respectively arranged between the inner node plates 132 and the collectors 120, serve especially to define further vibration nodes in order on the one hand to reduce the maximum mechanical stresses on the vibrating measuring tubes, and on the other hand to minimize the decoupling of vibration energy into a pipe in which the measurement sensor 100 is installed, or the coupling-in of interfering vibrations from the pipe.

To excite flexural vibrations of the measuring tubes in the X-direction—in relation to the longitudinal direction or the Z-axis in the middle of the measuring tubes 110 of the measurement sensor 100—an exciter arrangement 140 is provided between the two measuring tubes 110, for example an inductive exciter arrangement which comprises, for example, a plunger coil on a measuring tube and a plunger body on the oppositely situated measuring tube. The oscillator formed by the two measuring tubes is preferably to be excited with its current natural frequency. For detecting the vibrations of the measuring tubes, sensor arrangements 142 are provided in the longitudinal direction, symmetrically with respect to the exciter arrangements 140, and are respectively designed as an inductive arrangement with a plunger coil at one tube and a plunger body at the other tube. Details are known to the person skilled in the art and need not be explained here.

The measuring tubes 110 respectively have two first curved portions 114 which are symmetrical to one another in relation to the transverse plane of symmetry. Respectively adjoining the first curved portion 114 is a straight portion 116 to which a second curved portion 118 respectively in turn adjoins whose radius of curvature here is approximately two-thirds of the radius of curvature of the first curved portion 114.

The second curved portions 118 respectively pass through one of the openings 126 in the support tube 124 and open into one of the collectors 120.

The first curved portions 114 have annular reinforcement bodies 151, 152, 153, 154 with which the transverse sensitivity of the parameters of 'mass flow rate' and 'density' to pressure is reduced.

Figure 8:
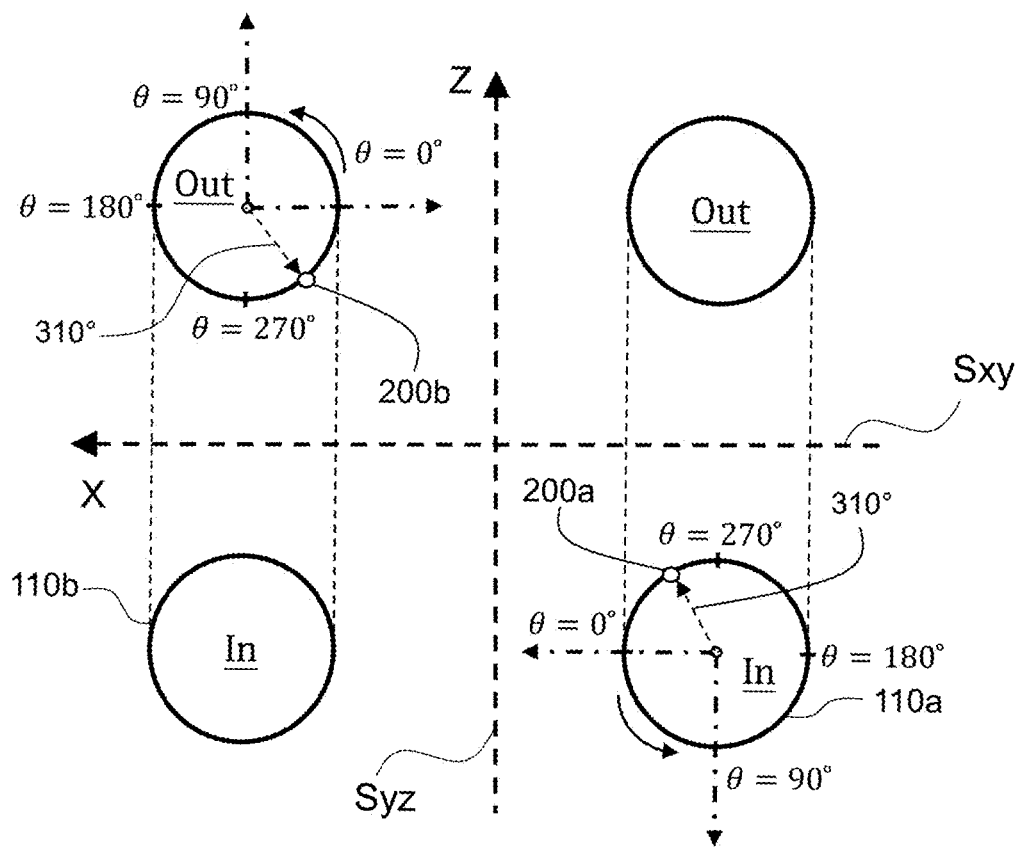
FIG. 8 shows a cross-section view of the measurement sensor using the coordinate system of FIG. 3.

To determine the density or the mass flow rate, the temperature of the measuring tubes 110a, 110b or of the medium flowing in the measuring tubes 110a, 110b is to be detected as accurately as possible. Although a plurality of temperature sensors at each of the measuring tubes would allow this in principle, this approach is on one hand too expensive, and on the other hand additional masses at the measuring tubes should be avoided as much as possible. Only one temperature sensor 200a, 200b is therefore arranged at each of the two measuring tubes 110a, 110b, wherein the temperature sensors 200a, 200b can be attached to the measuring tube 110a, 110b by gluing, (spot) welding, or soldering, or are tensioned with a clamping device against a surface region of the external surface of the measuring tubes 110a, 110b, as shown in FIGS. 1 and 8.

A third temperature sensor, not shown here, may be arranged at the carrier body to detect a representative temperature of the carrier tube.

As schematically illustrated in FIG. 1, the measurement sensor 100 according to the invention furthermore comprises an operation and evaluation circuit 250 which is configured to drive the oscillation exciter 140 via first interfaces 252; to receive the signals of the vibration sensors 142 and of the temperature sensors 200a, 200b as well as possibly further sensors; and, based on the signals, to calculate at least one physical parameter such as temperature, density, mass flow rate, and/or viscosity of a medium located in the measuring tubes; and to output the said at least one parameter to a control system via second interfaces 254.

A first degree of freedom in the positioning the first and second temperature sensors 200a, 200b is the position in the direction of the measuring tube center lines 112a, 112b. A position close to one of the couplers 132, 134 is problematic insofar as that the couplers can have a large thermal capacity and thus impair a rapid reaction of the temperature sensors to a changed media temperature; distanced from the couplers, the temperature sensors can firstly respectively be arranged between one of the inner couplers 132 and the adjacent, outer coupler 134, or secondly respectively be arranged between the inner coupler 132 and the transverse plane of symmetry. In the presently preferred second alternative, however, it should be noted that the contribution of the mass of the temperature sensor to the moment of inertia of the oscillator increases as the distance from the inner coupler 132 increases, and undesired damping effects increase as a result of increasing oscillation amplitudes. In the present exemplary embodiment, the range of positions considered for the temperature sensors 200a, 200b therefore remains restricted to the straight portions 116, wherein, for the temperature sensors 200a, 200b, a distance coordinate a of the inner couplers is defined that has a value of 0 directly at the inner couplers 132 and assumes the value 1 at the upper end of the straight portions.

Figure 3:
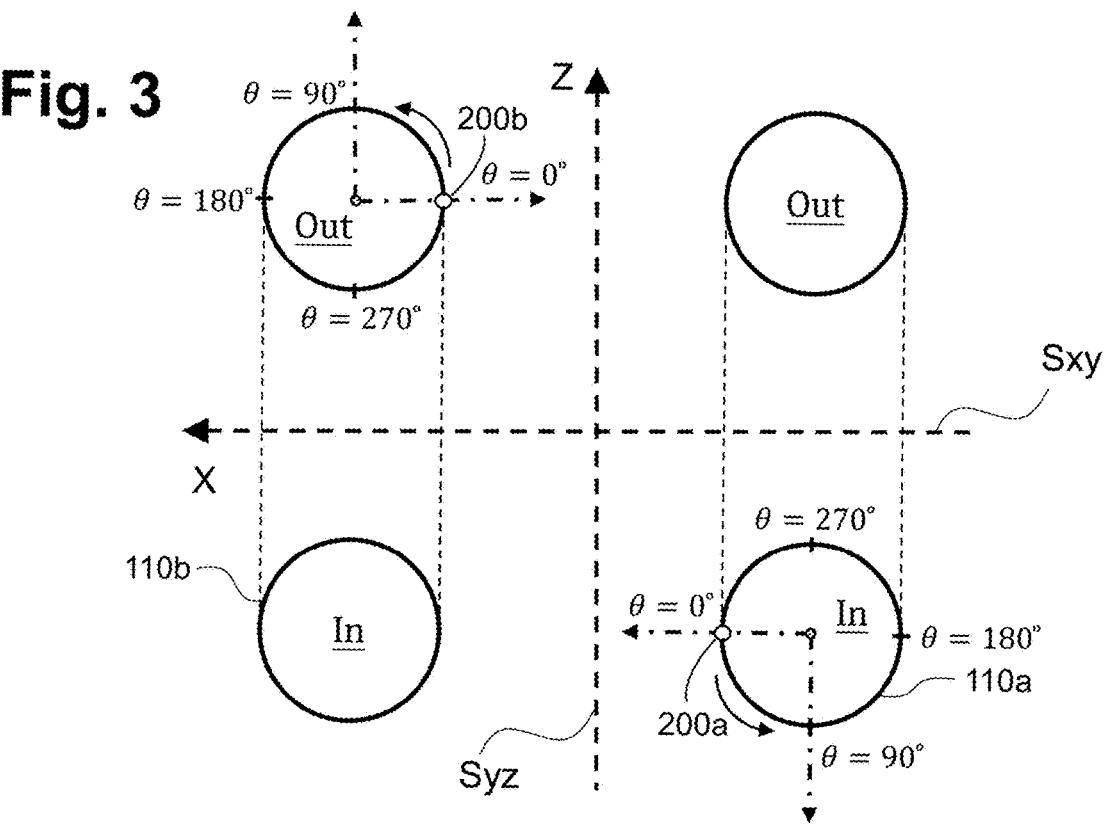
FIG. 3 shows a coordinate system for describing the position of temperature sensors of the measurement sensor according to the present disclosure.

A second degree of freedom is the position of the temperature sensors 200a, 200b along the circumference of the measuring tubes 110a, 110b. According to the invention, the temperature sensors 200a, 200b should be arranged symmetrically to one another in relation to the longitudinal plane of symmetry $S_{yz}$ and the transverse plane of symmetry $S_{xy}$. This symmetry is taken into account in the coordinate system in FIG. 3, which shows measuring tube cross-sections in which the temperature sensors 200a, 200b are arranged. With the specification of an angle θ which defines the position of a first temperature sensor 200a on the circumference of the measuring tube 110a, the position of the second temperature sensor 200b on the second measuring tube 110b will also be established on account of the symmetry conditions. In FIG. 3, the first temperature sensor 200a is arranged at the inlet end of the first measuring tube 110a, which is positioned on the right in the flow direction. Naturally, an inlet-end temperature sensor could instead also be arranged at the measuring tube that is on the left in the flow direction, connected to a positioning of an outlet-end temperature sensor meeting the above symmetry condition.

Figure 4A:
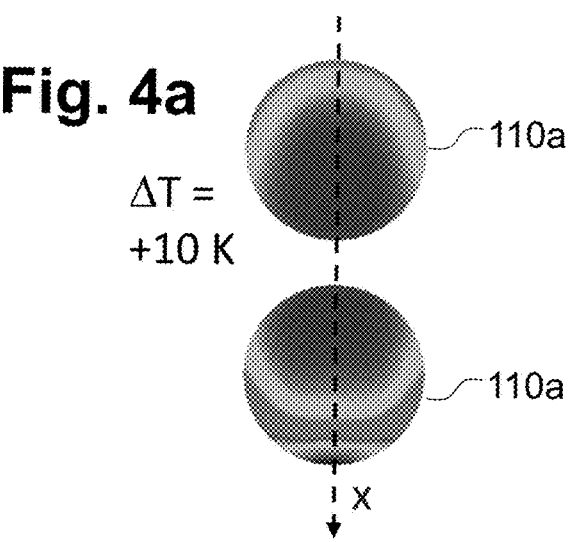
FIG. 4a shows a first temperature distribution in a cross-section through the measuring tubes at a higher medium temperature than in the surroundings of the measurement sensor; the x axis therein points in the direction of gravity.
Figure 4B:
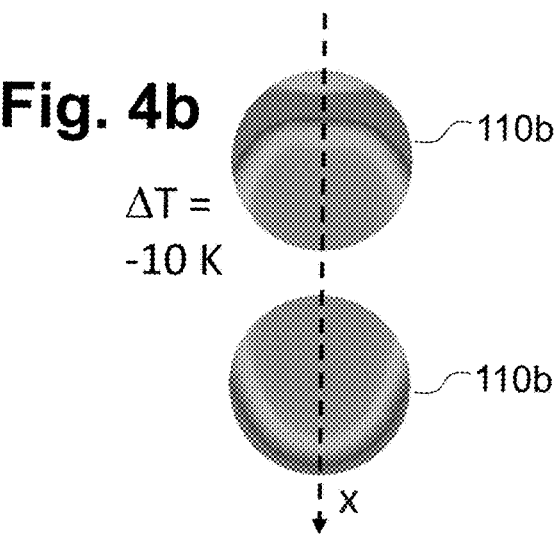
FIG. 4b shows a second temperature distribution in a cross-section through the measuring tubes at a lower medium temperature than in the surroundings of the measurement sensor; the x axis therein points in the direction of gravity.

The question of the sensor position is considerable especially given low Reynolds numbers, since in this regime there can be pronounced inhomogeneous temperature distributions. In FIGS. 4a and 4b, simulation results for temperature distribution in the measuring tubes after the inlet-end collector are shown for a flow with Re=20 and a temperature difference of +10 K and −10 K relative to the surroundings. The force of gravity thereby acts in the direction −X, i.e. the measurement sensor is inclined to the side and the measuring tube bends run horizontally. It can be seen that, depending on the position of the temperature sensors, entirely different temperature measurement values are obtained which, in the compensation of temperature effects, can lead to incorrect results in the determination of the physical parameters. As already mentioned above, the two measured temperature values in the form of an average medium temperature $T_m$ are input into the determination of the density ρ of the medium according to:

$$\rho = C_{0i} + C_{1i} f_i^{-2} + C_{2i} T_m f_i^{-2} + C_{3i} T_3 f_i^{-2}.$$

Insofar as vibronic measurement sensors are operated in different installation positions with respect to the gravitational acceleration g, there will be a corresponding variety of temperature distributions, which will make temperature measurement a lottery if the sensor position does not take this effect into account.

Figure 5:
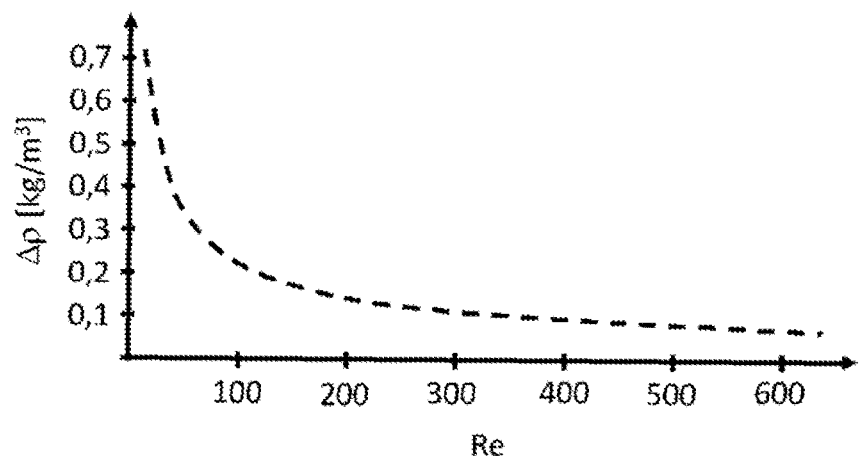
FIG. 5 diagram which shows the maximum density measurement error contribution of inhomogeneous temperature distributions given a temperature difference of 10 K for density measurement, as a function of the Reynolds number.

The maximum magnitude of the error contribution of this effect for the density measurement is shown in FIG. 5. The positions of the temperature sensors were hereby varied within the range 0≤α≤1 and 0°≤θ≤360°, and the respective density error was calculated in installation positions with the gravitational acceleration g in the direction +Y, −Y, +X, and −X for temperature differences of ΔT=+10 K and ΔT=−10

K. The error results by comparing the actual medium density with the medium density determined according to the above equation. From FIG. 5, it emerges that the error is of no great importance given higher Reynolds numbers, because in such instances there are hardly any pronounced inhomogeneous temperature distributions. The effect can inasmuch easily escape attention. However, the lower the Reynolds numbers Re become, the more important it will be.

Figure 6A:
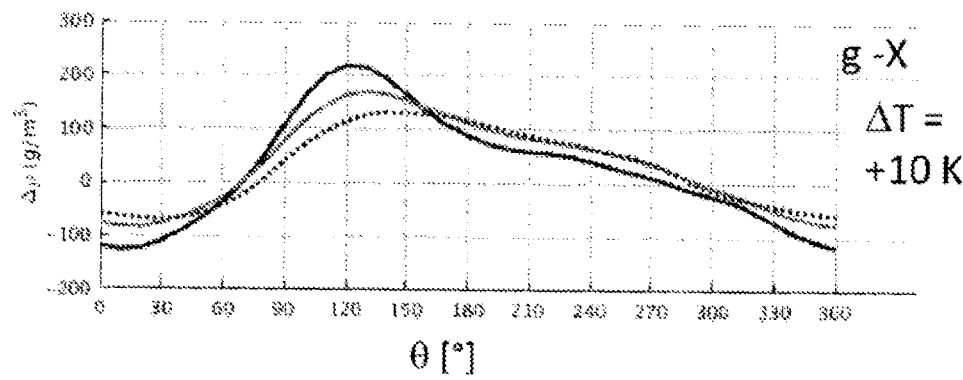
FIG. 6 diagram which shows the density measurement error contribution of inhomogeneous temperature distributions given a horizontally situated measuring tube bend and a temperature difference of +10 K relative to the surroundings, depending on the position of the temperature sensors.
Figure 6B:
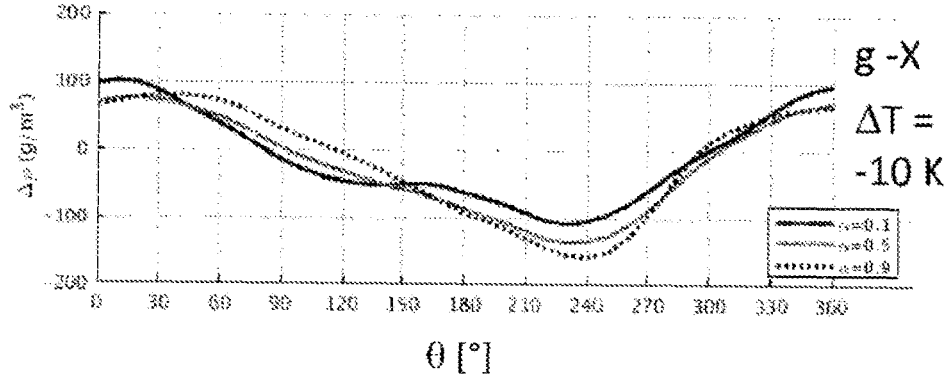
Figure 7A:
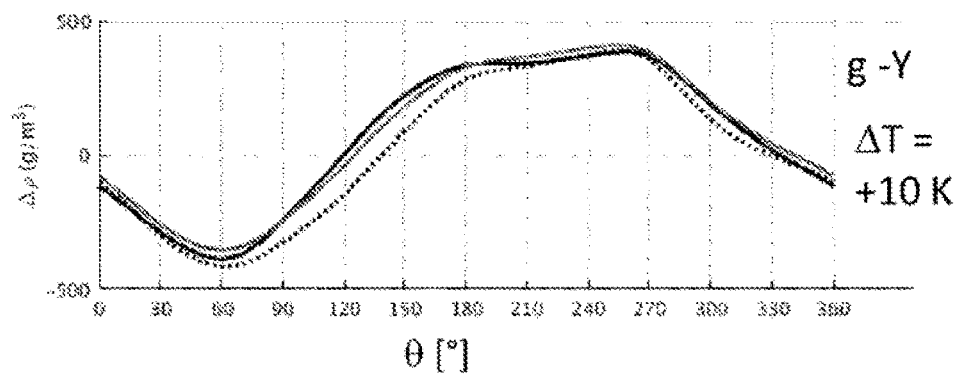
FIG. 7 diagram which shows the density measurement error contribution of inhomogeneous temperature distributions given an upright measuring tube bend and a temperature difference of +10 K relative to the surroundings, depending on the position of the temperature sensors.
FIG. 7c shows the density measurement error contribution of inhomogeneous temperature distributions given a downwardly directed measuring tube bend and a temperature difference of +10 K relative to the surroundings, depending on the position of the temperature sensors.
FIG. 7d shows the density measurement error contribution of inhomogeneous temperature distributions given a downwardly directed measuring tube bend and a temperature difference of −10 K relative to the surroundings, depending on the position of the temperature sensors.
Figure 7B:
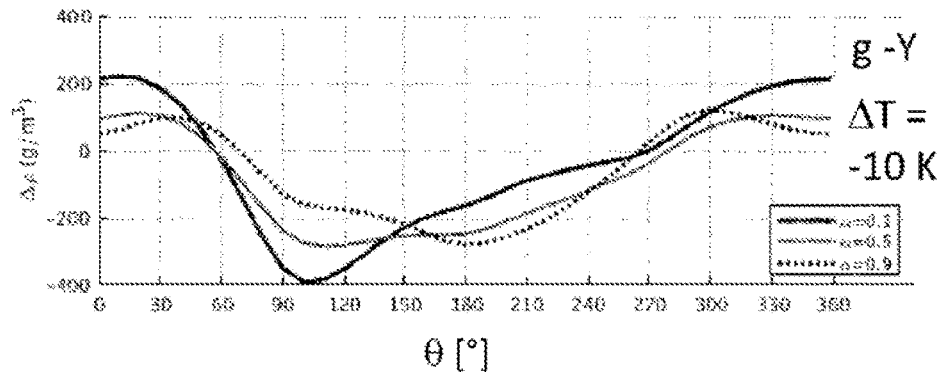
Figure 7C:
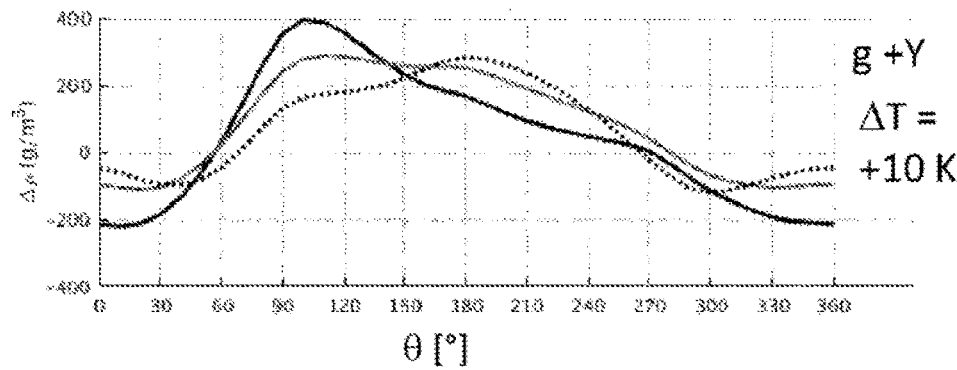
Figure 7D:
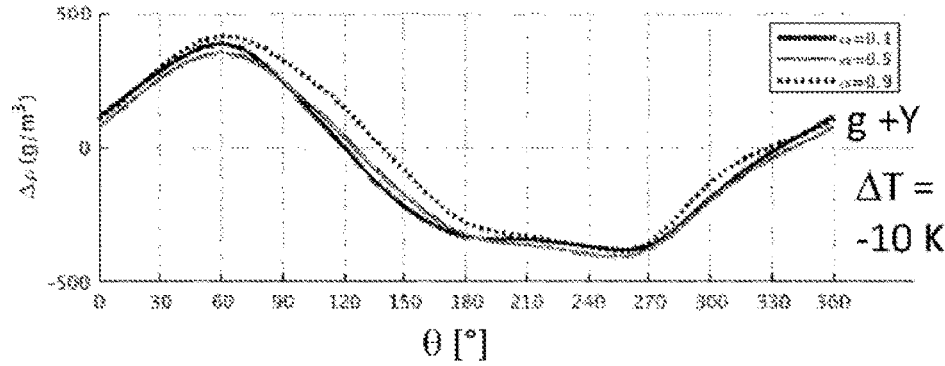

In FIGS. 6a and 6b, the density measurement error $\Delta\rho$ given Re=20 at $\Delta T$=+10 K or, respectively, $\Delta T$=−10 K is shown as a function of the position θ of the temperature sensors given $\alpha$=0.1, $\alpha$=0.5, and $\alpha$=0.9. The installation position here corresponds to that on which the temperature distributions in FIGS. 4a and 4b are based, thus that with the gravitational acceleration g in the direction −X.

In FIGS. 7a to 7d, the density measurement error $\Delta\rho$ given Re=20 at $\Delta T$=+10 K or, respectively, $\Delta T$=−10 K is shown as a function of the position e of the temperature sensors given $\alpha$=0.1, $\alpha$=0.5, and $\alpha$=0.9. The installation position of the measurement sensor for the calculation with respect to FIGS. 7a and 7b involves an upright measuring tube bend, so that the gravitational acceleration g points in the direction −Y. For the calculations with respect to FIGS. 7c and 7d, the measuring tube bend is oriented oppositely, so that the gravitational acceleration g points in the direction +Y.

After analysis of the data, as shown in FIGS. 6a, 6b and 7a-7d, it resulted that the range around θ=310°±of a tolerance range of, for example, 30° leads to a considerable reduction in the maximum density error that results from the different installation positions and changing signs of the temperature difference AT. The selection of the position of the temperature sensors in the longitudinal direction also affects the measurement error, although the effect is not quite so pronounced. It turns out to be advantageous if the temperature sensors are arranged approximately in the middle of the straight portions of the measuring tubes, that is to say approximately at $\alpha$=0.35, but this is not absolutely necessary for realizing the invention.

The invention claimed is:

1. A vibronic measurement sensor for determining at least one physical parameter of a flowable medium, the vibronic measurement sensor comprising:
    an oscillator including a first measuring tube and a second measuring tube, each curved in the rest position and configured to convey the medium, and further including a first coupler and a second coupler, wherein the first and second measuring tubes are connected to each other by the first coupler and the second coupler, wherein an oscillatable portion of the first and second measuring tubes, respectively, extends between the couplers;
    an exciter configured to excite at least one flexural vibration mode of the oscillator in which the oscillatable portions of the first and second measuring tubes oscillate counter to each other;
    at least one vibration sensor adapted to detect vibrations of the oscillator, at least in the at least one flexural vibration mode, and to output vibration-dependent signals;
    a first temperature sensor arranged on the first measuring tube and adapted to output a first temperature measurement signal that depends on a first temperature at a first surface portion of an exterior surface of the first measuring tube, which first surface portion is contacted by and defines a location of the first temperature sensor;
    a second temperature sensor arranged on the second measuring tube and adapted to output a second temperature measurement signal that depends on a second temperature at a second surface portion of an exterior surface of the second measuring tube, which second surface portion is contacted by and defines a location of the second temperature sensor; and
    an operating circuit configured to drive the exciter, to receive the vibration-dependent signals of the at least one vibration sensor, the first temperature measurement signal and second temperature measurement signal, to determine a vibration frequency of at least one flexural vibration mode of the oscillator based on the vibration-dependent signals of the at least one vibration sensor, and to determine the at least one physical parameter of the medium depending on a vibration characteristic of the oscillator that is characteristic of the parameter and of the first and second temperature measurement signals,
    wherein the vibronic measurement sensor has a longitudinal plane of symmetry extending between the first and second measuring tubes, relative to which the two measuring tubes extend symmetrically relative to each other, at least between the first coupler and the second coupler,
    wherein the vibronic measurement sensor has a transverse plane of symmetry extending perpendicular to the longitudinal plane of symmetry, relative to which the first and second measuring tubes respectively have a mirror-symmetrical course at least between the first coupler and the second coupler,
    wherein the first and second temperature sensors are disposed at a distance from the transverse plane of symmetry,
    wherein the first temperature sensor and the second temperature sensor are arranged rotationally symmetrical with respect to each other, relative to an intersection line between the longitudinal plane of symmetry and the transverse plane of symmetry,
    wherein the first temperature sensor is disposed in a section plane perpendicular to a measuring tube center line of the first measuring tube, wherein in the section plane vectors are defined relative to an intersection point of the measuring tube center line with the section plane, such that:
        a first vector of the defined vectors pointing in direction θ=0°, starting from the intersection point, extends toward the longitudinal plane of symmetry and extends perpendicular thereto; and
        a second vector of the defined vectors pointing in direction θ=90°, starting from the intersection point extends away from the transverse plane of symmetry,
    wherein the first temperature sensor is centered at an angle θ=310°+/−30° relative to the intersection point and the first and second vectors.

2. The vibronic measurement sensor of claim 1, wherein the first temperature sensor is centered at an angle θ=310°+/−10° relative to the intersection point and the first and second vectors.

3. The vibronic measurement sensor of claim 1, wherein the measuring tube center line of the first measuring tube has a length between the first coupler and the second coupler, wherein the section plane has a distance from the first coupler for which a ratio of the distance to the length is less than or equal to 0.25.

4. The vibronic measurement sensor of claim 3, wherein the ratio of the distance to the length is less than or equal to 0.08.

5. The vibronic measurement sensor of claim 1, wherein the measuring tube center line of the first measuring tube has a length between the first coupler and the second coupler, wherein the section plane has a distance from the first coupler for which a ratio of the distance to the length is greater than or equal to 0.01.

6. The vibronic measurement sensor of claim 1, wherein the ratio is greater than or equal to 0.04.

7. The vibronic measurement sensor of claim 1, wherein the oscillatable portions of the first and second measuring tubes, respectively, include two straight portions and an arcuate portion extending between the two straight portions, and wherein the section plane intersects the measuring tube center line in at least one of the two straight portions.

8. The vibronic measurement sensor of claim 7, wherein a length of the respective arcuate portion is not less than 30% of a length of the measuring tube center line between the first coupler and the second coupler.

9. The vibronic measurement sensor of claim 8, wherein the length of the respective arcuate portion is not less than 40% of the length of the measuring tube center line between the first coupler and the second coupler.

10. The vibronic measurement sensor of claim 1, wherein the first and second measuring tubes each have an inner diameter of not less than 10 mm.

11. The vibronic measurement sensor of claim 1, further comprising:
    a carrier body, wherein the first and second measuring tubes are connected to the carrier body in a flexurally rigid manner at an inlet end and at an outlet end, respectively; and
    a third temperature sensor adapted to detect a temperature of the carrier body and to output a third temperature measurement signal representing the temperature of the carrier body,
    wherein the operating circuit is configured to receive and use the third temperature measurement signal in determining the at least one physical parameter of the medium.

12. The vibronic measurement sensor of claim 1, wherein the at least one physical parameter includes a density of the medium, wherein the vibration characteristic of the oscillator that is characteristic of the parameter includes a vibration frequency of the oscillator.

13. The vibronic measurement sensor of claim 1, wherein the at least one physical parameter includes a mass flow rate of the medium, wherein the vibration characteristic of the oscillator that is characteristic of the parameter includes a phase difference or time difference between the signals of an inlet end and an outlet end of the at least one vibration sensor.

14. The vibronic measurement sensor of claim 1, wherein the at least one physical parameter includes a viscosity of the medium, wherein the vibration characteristic that is characteristic of the parameter includes an attenuation of an oscillation of the oscillator.

15. A method for determining at least one physical parameter of a flowable medium, the method comprising:
    providing a vibronic measurement sensor according to claim 1;
    determining the at least one physical parameter using the vibronic measurement sensor,
    wherein the flowable medium in the vibronic measurement sensor has a Reynolds number of less than 500.

16. The method of claim 14, wherein the flowable medium in the vibronic measurement sensor has a Reynolds number of less than 100.

\* \* \* \* \*